(12) United States Patent
Son et al.

(10) Patent No.: US 6,240,553 B1
(45) Date of Patent: May 29, 2001

(54) METHOD FOR PROVIDING SCALABLE IN-BAND AND OUT-OF-BAND ACCESS WITHIN A VIDEO-ON-DEMAND ENVIRONMENT

(75) Inventors: Yong Ho Son, Palo Alto; Michael E. Leimer, Fremont, both of CA (US)

(73) Assignee: DIVA Systems Corporation, Redwood City, CA (US)

( * ) Notice: Subject to any disclaimer, the term of this patent is extended or adjusted under 35 U.S.C. 154(b) by 0 days.

(21) Appl. No.: 09/458,895

(22) Filed: Dec. 10, 1999

Related U.S. Application Data

(60) Provisional application No. 60/127,125, filed on Mar. 31, 1999.

(51) Int. Cl.[7] .............................. H04N 7/173; H04J 3/16
(52) U.S. Cl. ........................ 725/95; 725/96; 725/126; 370/468
(58) Field of Search ..................... 348/7, 10, 12, 348/13; 709/217, 218, 219; 455/4.2, 5.1; 370/468, 528; 725/95, 96, 126

(56) References Cited

U.S. PATENT DOCUMENTS

| | | | |
|---|---|---|---|
| 5,225,902 | * 7/1993 | McMullan, Jr. | 358/86 |
| 5,544,161 | * 8/1996 | Bigham et al. | 370/58.1 |
| 5,740,075 | * 4/1998 | Bigham et al. | 364/514 |
| 5,818,438 | * 10/1998 | Howe et al. | 345/327 |
| 5,850,218 | * 12/1998 | Lajoie et al. | 345/327 |
| 6,055,315 | * 4/2000 | Doyle et al. | 380/242 |

* cited by examiner

Primary Examiner—Andrew Faile
Assistant Examiner—Kieu-Oanh Bui
(74) Attorney, Agent, or Firm—Thomason, Moser & Patterson, LLP

(57) ABSTRACT

A method and apparatus for adapting in-band channel bandwidth and out-of-band channel bandwidth to incremental increases or decreases in subscriber populations within a video-on-demand system or digital services provided to subscribers within the video-on-demand system.

5 Claims, 4 Drawing Sheets

METHOD FOR PROVIDING SCALABLE IN-BAND AND OUT-OF-BAND ACCESS WITHIN A VIDEO-ON-DEMAND ENVIRONMENT

CROSS REFERENCE TO RELATED APPLICATIONS

This application claims benefit of U.S. Provisional Patent Application 60/127,125, which was filed on Mar. 31, 1999.

BACKGROUND OF THE INVENTION

1. Field of the Invention

The present invention relates to an information distribution system such as a video-on-demand (VOD) system. More particularly, the present invention relates to a method and apparatus for providing scalable in-band and out-of-band communications channel support such that incremental increases in-bandwidth requirements are accommodated in a predictable manner.

2. Description of the Background Art

VOD systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference.

Current video-on-demand systems typically rely on content distribution systems designed for broadcast services, in which programs are transmitted to all subscribers at once. These VOD systems typically broadcast programs such as popular movies at staggered time intervals or live sporting events at a single broadcast time. Thus, the bandwidth allocations to the "in-band" (video delivery and associated audio delivery) channels of the access system are substantially fixed, regardless of the amount of subscribers within the VOD system. Each subscriber simply selects or, more appropriately, elects to decode and present a broadcast information stream including a desired program.

Within such a VOD system, the addition of digital services (such as interactive entertainment or other services) requires careful analysis of all existing and proposed digital services which utilize the "out-of-band" channels of the access system, followed by a renegotiation of access system support among all the digital service providers. The resulting system configuration tends to be excessively large in terms of the equipment required to implement incremental increases in digital services. This increase in equipment size and cost is of particular concern within the context of the smaller cable network hubs presently being deployed by a number of cable television systems. Additionally, the complexity of such equipment tends to prohibit the remote location of the digital services support equipment.

Therefore, it is seen to be desirable to provide an efficient method and apparatus for incrementally increasing (or decreasing) bandwidth capacity supporting digital services provided to a population of subscribers or users within, illustratively, a cable television system. It is also seen to be desirable to provide a method and apparatus responsive to increases (or decreases) in either the number or type of digital services provided to the subscriber population and to increases (or decreases) in the size of the subscriber population utilizing such digital services.

SUMMARY OF THE INVENTION

The disadvantages heretofore associated with the prior art are overcome by the present invention of a method and apparatus for adapting in-band channel bandwidth and out-of-band channel bandwidth to incremental increases or decreases in subscriber populations within a video-on-demand system or digital services provided to subscribers within the video-on-demand system.

Specifically, in an interactive information distribution system comprising information provider equipment coupled to information consumer equipment via a communications network supporting an in-band communications channel and an out-of-band communications channel, a method according to the invention for adapting said provider equipment in response to changes in the appropriate size of out-of-band channel bandwidth requirements, said method comprising the steps of: defining a relationship between an incremental increase in in-band channel bandwidth capability and an incremental increase in out-of-band channel bandwidth capability, wherein increases in bandwidth requirements for either channel above respective threshold levels results in the addition of an access controller to the system, said access controller providing predefined amounts of in-band channel bandwidth and out-of-band channel bandwidth, said predefined amounts of in-band and out-of-band channel bandwidth of said access controller conforming to said defined relationship.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
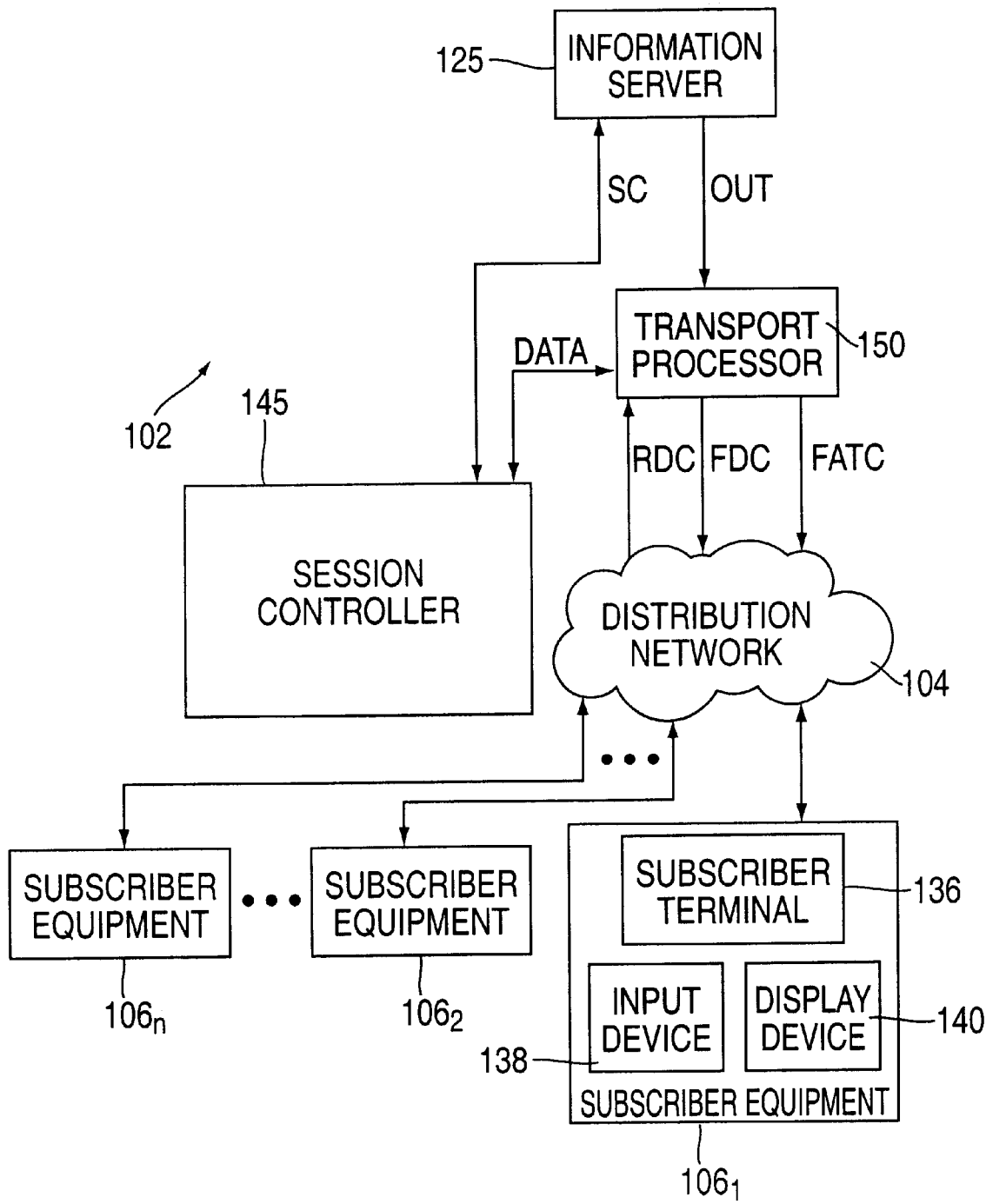
FIG. 1 depicts a high level block diagram of an interactive information distribution system.

FIG. 1 depicts a high level block diagram of an interactive information distribution system. Specifically, FIG. 1 depicts a high level block diagram of an interactive information distribution system 100 containing the present invention. The system 100 contains service provider equipment 102, a communications network 104 and subscriber equipment 106$_n$, where n is an integer greater than zero.

The service provider equipment 102 comprises an information server 125, a session controller 145 and a transport processor 150. Briefly, the session controller 145, in response to a request(s) from subscriber equipment 106, causes the requested content to be retrieved from the information server 125 and provided to the transport processor 150. The transport processor 150 combines or multiplexes the retrieved content to provide an output data stream for the requesting subscriber(s). The output data stream is conditioned for transport to the requested subscriber via a forward application transport channel (FATC) within the communications network 104. Additionally, upstream messages such as content requests are received from subscribers via a reverse data channel (RDC), while downstream messages are transmitted to subscribers via a forward data channel (FDC). Both the FDC and RDC are supported by the communications network 104.

The information server 125 is used to store content such as movies, television programs and other information offerings of the interactive information distribution system 100 of FIG. 1. The information server 125 is also used to store assets such as bit map imagery, graphic overlay, control scripts and the like. The assets may comprise, for example, navigation assets that are used by a set top terminal to interactively navigate, and select for viewing, the offerings or content available from the service provider equipment 102. The information server 125, in response to a control SC produced by the session controller 145, provides content and/or asset data to the transport processor 150 via the signal path OUT, illustratively a high speed asynchronous serial interface HS-ASI bus.

The session controller 145 provides session control of the information flowing to and from the information server 125, and may be generally described as a system providing or controlling communications between, for example, a cable system head-end and one or more set top terminals 136 The session controller 145 produces the storage control signal SC for controlling and communicating with the information server 125. The session controller 145 is also coupled to the transport processor 150 via a data signal DATA, illustratively an Ethernet bus. The session controller 145 controls and updates the transport processor 150 via communications passed to the transport processor 150 via the data bus DATA. In addition, information to be provided to subscribers via the forward data channel FDC is coupled to the transport processor via the Ethernet connection. Similarly, information received from subscribers via the reverse data channel RDC is coupled to the session controller 145 via the Ethernet link. In response to a user request for particular content, the session controller 145 causes the requested content file to be streamed from the information server 125 to the transport processor 150.

The session controller 145 sends data, such as commands, encryption keys and the like, to set top terminals via the forward data channel (FDC). The session controller 145 receives data, such as information stream requests and session initiation data (set top identification, capability and the like) via the reverse data channel (RDC). The FDC and RDC are accessed by the session controller 145 via the Ethernet link DATA. The FDC and RDC are supported by the distribution network 104 and comprise relatively low bandwidth data channels utilizing QPSK (Quadrature Phase Shift Keying), QAM (Quadrature Amplitude Modulation) or other modulation techniques. The FDC is typically modulated onto a carrier frequency in the range of 50–750 Mhz, where the channel capacity is appropriately 1–2 Mbps. The RDC is typically modulated onto a carrier frequency in the range of 5–42 Mhz, where the channel capacity is approximately 64 Kbps. In some implementations, the FDC and RDC are symmetrical in terms of bandwidth utilization. That is, both the FDC and RDC may comprise, for example, 1.5 megabit per second (QPSK) communications channels.

The transport processor 150 accomplishes all of the FATC, FDC and RDC interface requirements of the system 100 of FIG. 1. Specifically, the transport processor 150 is coupled to subscriber equipment via the forward applications transport channel (FATC), the forward data channel (FDC) and the reverse data channel (RDC). The FATC is supported by the distribution network 104 and comprises a relatively high bandwidth communications channel well suited to carrying video, audio and data such as, for example, multiplexed MPEG-2 transport packets. It should be noted that data normally conveyed to a set top terminal via the FDC may be included in the FATC data stream.

The transport processor 150 modulates the content and/or asset data streams onto one or more carrier frequencies for transmission on the FATC, the so-called "in-band" carrier frequencies. The forward application transport channel comprises, illustratively, 2–5 conventional cable television channels (e.g., 6 Mhz bandwidth channels) within a hybrid fiber-coax cable network. Each of the conventional cable channels is capable of simultaneously supporting up to 10 streams of video information.

The distribution network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams. In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or a set top box 136, a display device 140 (e.g. a conventional television) and a user input device 138 (e.g. a remote control device). Each set top terminal 136 receives content and/or asset data streams from the FATC, demodulates the received data streams and, in the case of video streams, processes the demodulated video streams for subsequent display on the display device 140. In the case of receiving scrambled data streams, the STT descrambles the received data streams using the descrambling messages DM provided to the STT via the FATC or the FDC. The STT uses the authorization messages AM provided via the FATC or FDC to determine if a descrambling of the received scrambled stream is authorized. In addition, the set top terminal 136 accepts commands from the remote control input device 138 or other input device. These commands are formatted, modulated, and transmitted through the distribution network 104 via the reverse data channel RDC to the session controller 145. These commands are preferably transmitted through the same network used to transmit information to the set top terminal. However, the RDC coupling the set top terminal to the provider equipment 102 may be a separate network, e.g. a FATC through a television cable network and an RDC through a telephone network. The telephone network could also support the FDC.

As previously discussed, the FDC and RDC are known as "out-of-band" channels, while the FATC is known as an "in-band" channel. The in-band channels are used to transmit and receive information between the information provider equipment 102 and the subscriber equipment 106 in a manner enabling various digital services. For example, one of the digital services utilized by each of the subscribers within the interactive information distribution system 100 of FIG. 1 is that of the "Navigator" service. The Navigator service or Navigator functionality is described in more detail in U.S. patent application Ser. No. 08/984,427, filed Dec. 3, 1997, and incorporated herein by reference in its entirety. Briefly, the Navigator utilizes a combination of MPEG content (such as MPEG video content and related MPEG audio content) and Navigator asset data to provide viewers with a means of selecting and ordering programming and other services. Navigator assets include bit maps and navigation control scripts. As a set top box user is "navigating," the set top box extracts the asset data from the transport stream and uses that data to provide bit map overlays on top of the MPEG content. The control data within the assets is used to define the layout of the screen and take actions based on viewer input. Assets, such as the aforementioned Navigator assets, are typically packaged as MPEG transport packets at a multiplexed long width content-representative MPEG packets to produce a single MPEG transport stream file. This transport stream file may be distributed to subscribers utilizing the in-band communication channel. However, where Navigator assets and content-representative MPEG packets are not combinable, the Navigator assets may be provided to subscribers via the out-of-band channels.

Other digital services comprise interactive shopping services, internet access services, telephone directory and other information services. Subscribers interacting with the system may select such services and interact to achieve some desirable result. While many of these digital services utilize relatively small amounts of bandwidth (e.g., telephone directory look-up services), some of the digital services are extremely bandwidth intensive (e.g., navigation and graphically intensive interactive shopping services). As such, depending upon the amount of users utilizing the digital services, changes in usage patterns of those users or simply an increase in the amount of digital services available, the bandwidth utilization level of the out-of-band channels may approach a utilization level limit. In the case of actual utilization of the bandwidth approaching the bandwidth utilization limit, digital services to one or more subscribers will be at least degraded if not interrupted.

Figure 2:
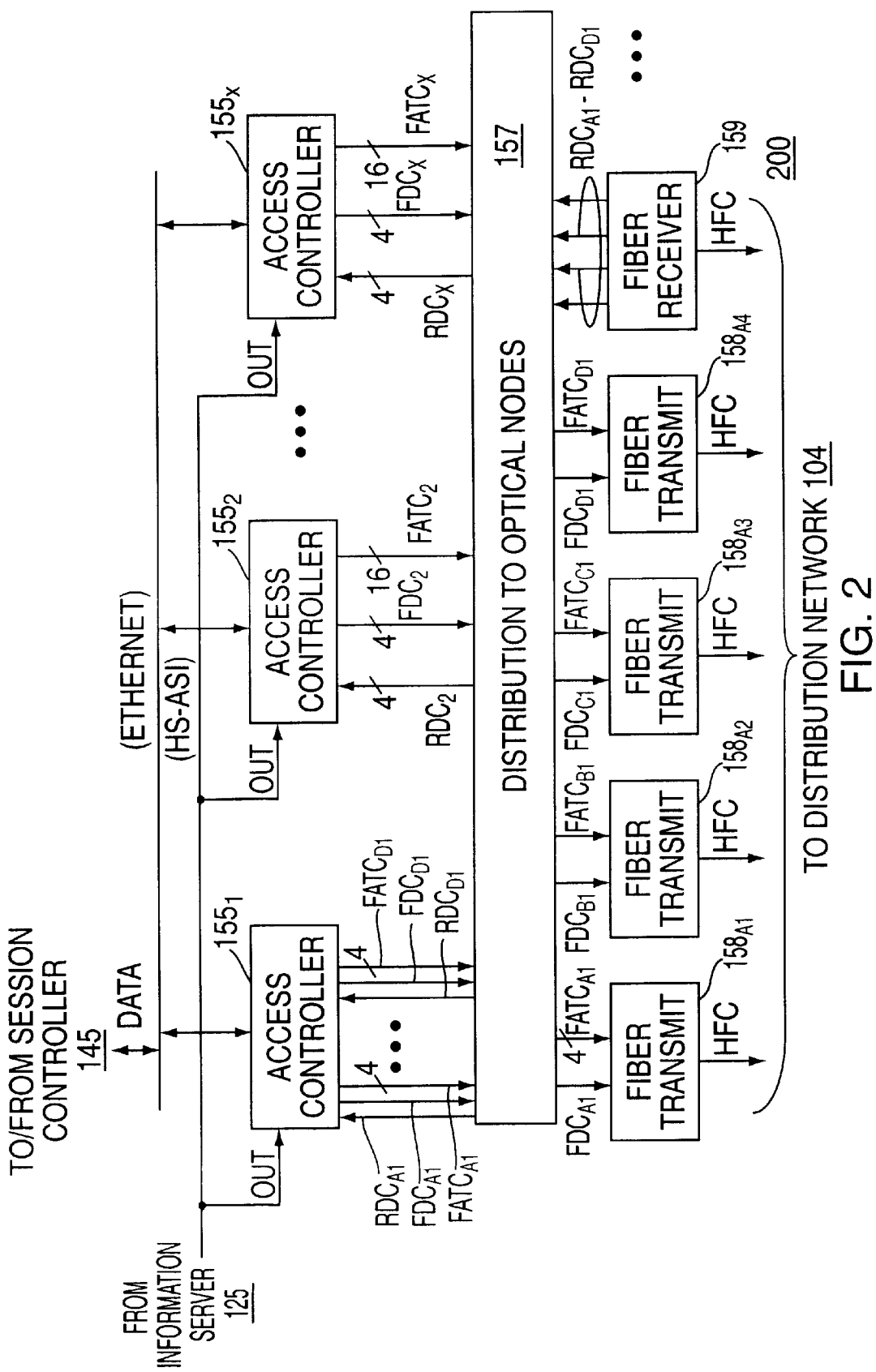
FIG. 2 depicts a high level block diagram of a transport processor suitable for use in the interactive information distribution system of FIG. 1.

FIG. 2 depicts a high level block diagram of a transport processor suitable for use in the interactive information distribution system of FIG. 1. Specifically, FIG. 2 depicts a transport processor 150 comprising a plurality of access controllers (Acs) $155_1$–$155_x$ (collectively access controllers 155), where x is an integer. Each of the access controllers 155 is depicted as being coupled to the session controller 145 via an Ethernet link DATA. It should be noted that the connection to the session controller 145 may be achieved using other types of communications media such as a fiber-channel. Each access controller 155 is also depicted as being coupled to receive the output stream OUT produced by the information server 125.

The output stream OUT produced by the information server 125 typically comprises a high speed serial output line in which video content, other content and asset data to be provided to subscriber equipment has been transport encoded according to, for example, the MPEG standards. In the preferred embodiment, the physical layer supporting the output stream OUT comprises a high speed asynchronous serial (HS-ASI) interface which is discussed in more detail in commonly assigned and contemporaneously filed U.S. patent applications Ser. No. 09/459,215 (Attorney Docket No. 048) and Ser. No. 09/458,339 Attorney Docket No. 051), both of which are incorporated herein by reference in their entireties. Briefly, the HS-ASI interface and protocol comprises a method and data structure suitable for routing and processing MPEG packets within a high speed serial network. The MPEG packets are encapsulated in new packet structures including routing information such that a multi-port HS-ASI switch can send the packet to the correct port. Each packet is uniquely identified so that it can be verified and routed independently from any other packet that is using the same physical connection. That is, a destination address uniquely identifies each packet within the network.

The destination address defines within a HS-ASI packet which of the plurality of access controllers 155 should receive the packet. As will be discussed in more detail below, each of the access controllers 155 provides information services and interactive control and messaging services to a respective group of subscribers or users of the system. Thus, in the case of subscribers or users associated with a first access controller, such as access controller $155_1$, the HS-ASI packets associated with content and/or asset data intended for those users includes a destination address unique to that access controller. Alternatively, the destination address is unique to the particular subscribers intended to receive the content and/or asset data. In this case, each access controller 155 compares the destination addresses of the received packets to the addresses of subscribers associated with the respective access controller, and retrieves from the HS-ASI bus those packets. The particular packet structure and methods of utilizing the HS-ASI communication channel are described in more detail in the above-referenced patents.

Each access controller (AC) is a modular element providing access to cable system architectures for digital services such as video-on-demand (VOD). An access controller may be readily customized to fit various headend topologies, including combinations of complex ring and star topologies. Such topologies are discussed in more detail in commonly assigned, simultaneously filed U.S. patent application Ser. No. 09/458,339 (Attorney Docket No. 051). Thus, the modularity and small size of the AC enable it to easily fit within cable network hubs as well as provide, in a remote application, an outlying network access point within a cable television system.

A single AC typically serves, illustratively, 128 to 176 concurrent DIVA VOD streams for 16 channels of 64 QAM and 256 QAM respectively. At a 10:1 ratio of VOD subscribers to concurrent VOD sessions, each AC supports 17,600 VOD subscribers at 256 QAM and 12,800 VOD subscribers at 64 QAM. However, as subscription penetration increases (i.e., new subscribers or users are added to the system), additional ACs are added to the transport processor 150 such that the cable plant is divided into multiple partitions of equal subscriber populations. Thus, the AC configuration described above with respect to FIGS. 2 and 3 provides a modular and scalable increase in in-band and out-of-band communication channel bandwidth capability. Specifically, the AC 155 comprises an in-band channel bandwidth capability that is fixed (in terms of bandwidth size) with respect to the out-of-band channel bandwidth capabilities. In this manner, increases or decreases in subscriber populations serviced by the interactive information distribution system 100 of FIG. 1 may be accommodated in a manner avoiding complex calculations of bandwidth allocations.

In the exemplary embodiment, each of the access controllers 155 is capable of supporting 16 forward application transport channels, four forward data channels and four reverse data channels. For purposes of simplification, the access controllers 155 are depicted as communicating with a distribution to optical nodes module 157 via four respective signal groups. Referring to the first access controller 155₁, a first group of signals comprises a first forward channel $FDC_{A1}$, a first reverse data channel $RDC_{A1}$ and a first four forward access transport channels $FATC_{A1}$. Additionally, access controller 155₁ provides three other similar groups of signals, including the fourth group which is depicted as including the fourth forward data channel $FDC_{D4}$, fourth reverse data channel $RDC_{D4}$ and fourth group of four forward access channels $FATC_{D4}$. Each of the remaining access controllers 155₂ through 155ₓ is associated with, respectively, four reverse data channels ($RDC_2$ through $RDC_x$), four forward data channels ($FDC_2$ through $FDC_x$) and 16 forward application transport channels ($FATC_2$ through $FATC_x$). Thus, each access controller 155 routes respective groups of forward and reverse data channels and forward application transport channels through the distribution to optical nodes module 157 to respective fiber transmitters and fiber receivers. Each access controller 155 is associated with four fiber transmitters $158_{A1}$ through $158_{A4}$ and one fiber receiver 159. The distribution to optical nodes module 157 multiplexes or combines each forward data channel with the four corresponding forward access transport channels and couples the combined channels to a respective fiber transmitter 158. Alternatively, the distribution to optical nodes module 157 routes, without multiplexing or combining, the forward data channel and respective forward application transport channels to the appropriate fiber transmitter 158.

Fiber transmitter $158_{A1}$ receives the first forward data channel $FDC_{A1}$ and corresponding first four forward application transport channels $FATC_{A1}$. The fiber transmitter $158_{A1}$ modulates received channels onto the appropriate frequencies for transmission by hybrid fiber coaxial (HFC) transmission links to the distribution network 104. Similarly, second through fourth fiber transmitters $158_{A2}$ through $158_{A4}$ receive and modulate second through fourth forward data channels ($FDC_{B1}$ through $FDC_{D1}$) and corresponding (e.g., QUAD) forward access transport channels ($FATC_{B1}$ through $FATC_{D1}$) to fiber transmitters $158_{A2}$ and $158_{A4}$.

Each of the fiber transmitters $158_{A1}$ through $158_{A4}$ transmits its respective forward data and application transport channels to appropriate subscribers 106 via the distribution network 104 using the hybrid fiber coaxial links.

Fiber receiver 159 receives, from a hybrid fiber coaxial link, reverse data channel information from one or more of the subscribers serviced by the first access controller 155₁. The fiber receiver 159 provides four reverse data channels $RDC_{A1}$ through $RDC_{D1}$ to the distribution to optical nodes module 157 for distribution to the appropriate reverse data channel inputs $RDC_{A1}$ through $RDC_{D1}$ of the first access controller 155₁. In this manner, a single fiber receiver is used to provide all reverse data channel communication between the first access controller 155₁ and the distribution network 104. Similarly, four fiber transmitters $158_{A1}$ through $158_{A4}$ are used to provide all forward data channel and forward application transport channel communications between the first access controller 155₁ and a distribution network 104.

While not shown, it will be appreciated that access controllers 155₂ through 155ₓ are associated with respective groupings of four fiber transmitters 158 and one fiber receiver 159. It will be further appreciated by those skilled in the art that more or fewer fiber transmitters 158 or fiber receivers 159 may be employed to practice the invention. That is, the inventors contemplate various modifications, including modifications to the number of fiber transmitters 158 and fiber receivers 159, while still practicing the invention.

Figure 3:
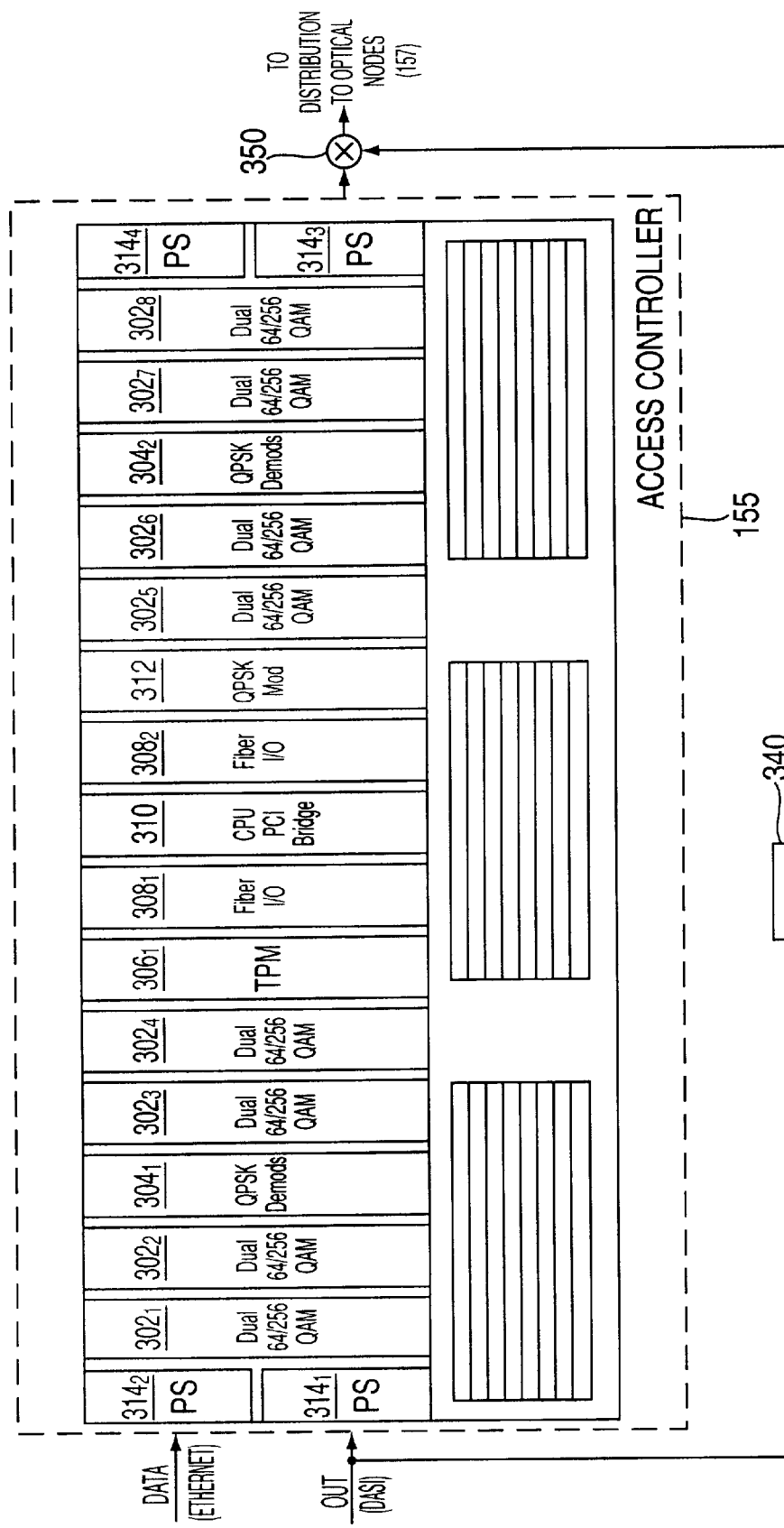
FIG. 3 depicts a high level block diagram of an access controller suitable for use in the transport processor of FIG. 2.

FIG. 3 depicts a high level block diagram of an access controller AC suitable for use in the transport processor of FIG. 2. Specifically, FIG. 3 depicts a high level block diagram of a physical arrangement of an access controller 150 in a manner showing the various finctional elements comprising one embodiment of an access controller. The depiction of the access controller 155 in FIG. 3 is that of a plurality of finctional elements rack mounted to provide a modular implementation of the access controller 155.

The AC depicted in FIG. 3 comprises a compact rack mountable multiple slot chassis that is readily configurable to adapt to each cable plant in which the AC is deployed. The AC utilizes the CompactPCI-based industry standard backplane to link the various included modules. The following modules are typically configured within the access controller (AC). A transport processing module (TPM) 306, which terminates the, illustratively, 1 gigabit per second HS-ASI-based optical transport stream provided by the information server 125 from either a local or a remote location, and fiber I/O modules 308. The TPM processes the HS-ASI stream to provide routing and re-multiplexing for 64 QAM or 256 QAM channels. A central processing unit (CPU)/PCI bridge module 310 hosts the command, control and management finctions for the AC. At least one fiber optic input/output (I/O) interface board 308 allowing the AC to interface with combinations of complex ring and star topologies. At least one QAM modulator/up converter 302 provides downstream modulation of data carried via the forward applications transport channel. QPSK modulator 312 providing modulation of data to be carried via the forward data channel FDC. QPSK demodulator 304 providing demodulation of data carried by the reverse data channel RDC. It should also be noted that the QPSK modulator 312 and QPSK demodulator 304 are both designed to support the various modules within, and connected to, the AC. In this manner, control and configuration information may be provided to the AC, regardless of whether the AC is installed locally or remotely with respect to the cable plant.

Referring now to FIG. 3, the access controller depicted and described above is shown in a remote configuration. Specifically, the optical HS-ASI stream out, in addition to be coupled to the access controller 155, is coupled to an input of an optical-to-electrical signal translator 340. The optical-to-electrical signal translator 340 extracts the transport packets encoded within the HS-ASI packets and provides those extracted packets to a multiplexer 350. The TPM 306 multiplexes the output packets extracted from the HS-ASI stream and any information provided by the access controller 155 to produce a transport stream suitable for processing by a coax plant (not shown). The RF combiner 350 combines RF signals from individual QAM modulators and up converters 302 and QPSK modulator 312 with other down stream channels, such as broadcast channels, to send to various optical transmitters and, eventually, to subscribers 106.

The remote access controller configuration described above advantageously enables an access controller to be physically located near the transmission nodes providing signal to individual subscribers within a "neighborhood." In this manner, the access controller 155 enables the use of the highly efficient, optically transmitted HS-ASI stream to be used to provide information to finctional elements, such as the access controller, within a cable system at a transmission point closely proximate the subscribers within that system.

Figure 4:
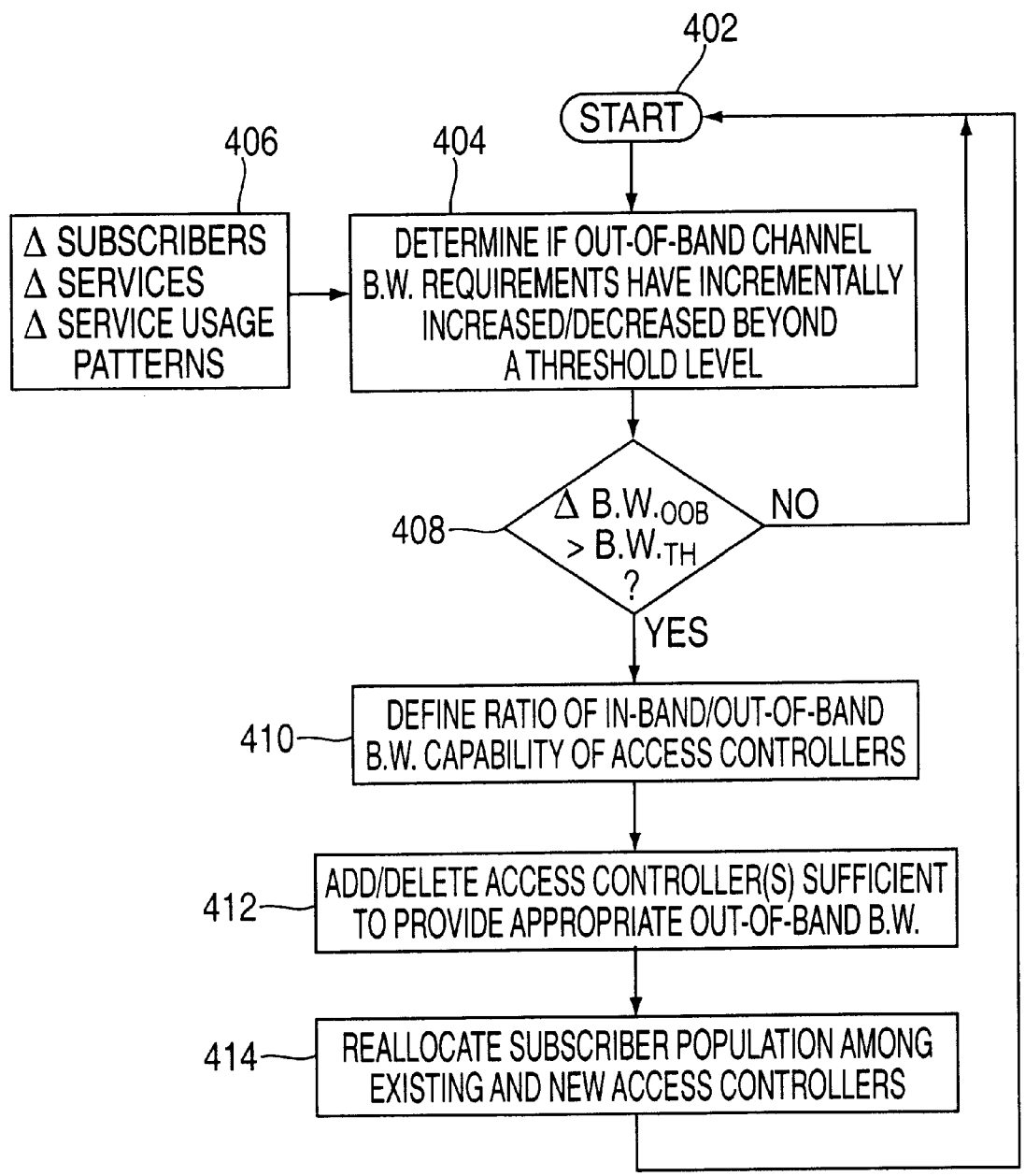
FIG. 4 depicts a flow diagram of a method for adapting bandwidth capability, particularly in-band channel bandwidth capability, within an interactive information distribution system.

FIG. 4 depicts a flow diagram of a method for adapting bandwidth capability, particularly in-band channel bandwidth capability, within an interactive information distribution system. Specifically, the method of FIG. 4 allows the adaptation of in-band channel and out-of-band channel bandwidth capabilities based upon increases or decreases in subscriber population, digital services or other services provided to the subscribers, changes in service usage patterns and other factors. The method 400 provides a modular approach in which complex calculations based upon the existing topology of the VOD head end or information provider equipment are avoided.

The method 400 at FIG. 4 is entered at step 402 and proceeds to step 404, where a determination is made as to whether the in-band channel bandwidth requirements have incrementally increased or decreased beyond a threshold level. The determination at step 404 is made with respect to at least the criteria denoted in box 406; namely, a change in the number of subscribers within the system, a change in the number or types of services offered to the subscribers, or a change in usage patterns of the newly offered or existing services by the subscribers such that increased or decreased out-of-band channel bandwidth is appropriate. The method 400 then proceeds to step 408.

At step 408, a query is made as to whether the out-of-band bandwidth requirements ($BW_{OOB}$) have changed by an amount greater than the threshold level ($BW_{TH}$). If the query at step 408 is answered negatively, then the method 400 proceeds to step 404. If the query at step 408 is answered affirmatively, then the method 400 proceeds to step 410.

The threshold level used to trigger an affirmative decision at step 408 may comprise any threshold level suitable for the system. For example, assuming that each access controller 155 within the system has a normalized out-of-band channel bandwidth capability of 1. An appropriate threshold level for increasing bandwidth allocation might be an incremental increase in bandwidth requirements of 0.5 (i.e., half of the out-of-band channel bandwidth provided by a single access controller). Similarly, an appropriate out-of-band bandwidth decrease threshold level might comprise a decrease of 1.5 (i.e., the amount of bandwidth provided by 1.5 access controllers). Thus, in addition to "scaling up" out-of-band channel and in-band channel bandwidth capabilities, the invention is also capable of "scaling down" such capabilities. In this manner, changes in cable system topology (such as dividing subscriber populations into smaller population groups or neighborhoods) or digital service offerings and/or usage patterns may be accommodated in a logical manner and with appropriate control of costs and complexity related to equipment upgrades or modifications.

At step 410 a ratio of in-band channel bandwidth to out-of-band channel bandwidth is defined with respect to the capability of an access controller. That is, each access controller 155 to be added to, or removed from, the transport processor 155 is defined in terms of a fixed ratio of in-band channel to out-of-band channel bandwidth capability. In this manner, the bandwidth adaptation problem space is reduced to one of linear scaling up (or scaling down) of the capability of the information provider equipment deployed to support the population of subscribers. The method 400 then proceeds to step 412.

At step 412 one or more access controllers are added to (or deleted from) the transport processor 150 to provide appropriate in-band channel and out-of-band channel bandwidth to the service provider equipment 102. It should be noted that the addition or deletion of access controllers is ideally performed in a manner avoiding disruptions of service to subscribers. The method 400 then proceeds to step 414.

At step 414 the subscriber population is reallocated among existing and new access controllers. That is, in the case of adding one or more access controllers based upon incremental increases in out-of-band channel bandwidth requirements, the subscriber population is reallocated among the existing and newly added access controllers such that each access controller operates at a roughly comparable bandwidth utilization level. In this manner, the average latency experienced by each user is proportionately reduced with respect to the increase in bandwidth capability.

It will be appreciated by those skilled in the art that the steps forming the above-described method 400 need not be performed in the order named. For example, at step 410, the definition of the ratio of in-band channel and out-of-band channel bandwidth may be predefined, rather than being defined as part of a decision making process. Moreover, the reallocation of subscriber populations performed at step 414 may be performed using only a subset of the existing subscriber population (subscribers on only one or two access controllers being reallocated) or may be avoided entirely by utilizing new access controllers for servicing new subscribers only. These and other modifications will be readily appreciated by those skilled in the art and informed by this disclosure.

Although various embodiments which incorporate the teachings of the present invention have been shown and described in detail herein, those skilled in the art can readily devise many other varied embodiments that still incorporate these teachings.

What is claimed is:

1. In an interactive information distribution system comprising information provider equipment coupled to information consumer equipment via a communications network supporting an in-band communications channel and an out-of-band communications channel, a method for adapting said provider equipment in response to changes in the appropriate size of out-of-band channel bandwidth requirements, said method comprising the steps of:

defining a relationship between an incremental increase in in-band channel bandwidth capability and an incremental increase in out-of-band channel bandwidth capability, wherein increases in bandwidth requirements for either channel above respective threshold levels results in the addition of an access controller to the system, said access controller providing predefined amounts of in-band channel bandwidth and out-of-band channel bandwidth, said predefined amounts of in-band and out-of-band channel bandwidth of said access controller conforming to said defined relationship.

2. The method of claim 1, wherein said relationship comprises a fixed ratio of in-band channel bandwidth and out-of-band channel bandwidth.

3. The method of claim 2, wherein said ratio is defined by providing, within each access controller, a first number of forward data channel modulators, a second number of reverse data channel demodulators, and a third number of forward applications channel modulators.

4. In an interactive information distribution system comprising information provider equipment having a plurality of access controllers coupled to information consumer equipment via a communications network, for supporting an in-band communications channel and an out-of-band channel, a method for managing said in-band channel bandwidth and said out-of-band channel bandwidth, comprising the steps of:

determining via said session controller, whether said in-band channel bandwidth requirements have incrementally increased or decreased for each access controller beyond an in-band threshold level;

determining whether said out-of-band channel bandwidth requirements have incrementally increased or decreased for each access controller beyond an out-of-band threshold level;

defining a fixed ratio of in-band channel bandwidth to out-of-band channel bandwidth with respect to current capabilities of said plurality of access controllers;

adding one or more access controllers to the plurality of access controllers in an instance where the in-band or out-of-band threshold levels are exceeded;

reallocating said information consumer equipment among said plurality of access controllers, wherein said in-band and out-of-band channel bandwidths are changed in an amount proportional to said fixed ratio.

5. The method of claim 4 further comprising the step of:

removing one or more access controllers from the plurality of access controllers in an instance where the in-band or out-of-band threshold levels are not exceeded.

* * * * *